(12) United States Patent
Singh

(10) Patent No.: US 6,309,695 B1
(45) Date of Patent: Oct. 30, 2001

(54) PROCESS FOR THE PREPARATION OF A THICK FILM RESISTOR USEFUL FOR MAKING STRAIN GAUGE

(75) Inventor: Awatar Singh, Rajasthan (IN)

(73) Assignee: Council of Scientific & Industrial Research of Rafi Marg, New Delhi (IN)

( * ) Notice: Subject to any disclaimer, the term of this patent is extended or adjusted under 35 U.S.C. 154(b) by 0 days.

(21) Appl. No.: 09/299,090

(22) Filed: Apr. 26, 1999

(30) Foreign Application Priority Data

Apr. 27, 1998 (IN) ........................................ 1101/98

(51) Int. Cl.[7] ............................. B05D 5/12; H01C 17/00
(52) U.S. Cl. ..................... 427/103; 427/125; 427/126.5; 29/610.1; 29/620
(58) Field of Search ..................................... 427/101, 103, 427/123, 125, 126.3, 126.5; 29/610.1, 620

(56) References Cited

U.S. PATENT DOCUMENTS 3,876,560 * 4/1975 Kuo et al. ............................. 252/514
4,796,356 * 1/1989 Ozaki ..................................... 29/620
5,206,624 * 4/1993 Patel et al. ........................... 338/308

FOREIGN PATENT DOCUMENTS

136213 * 6/1991 (JP) .

* cited by examiner

Primary Examiner—Brian K. Talbot
(74) Attorney, Agent, or Firm—Dickinson Wright PLLC

(57) ABSTRACT

This invention particularly relates to a thick film resistor and a process for the preparation of said thick firm resistor useful for making strain gauge with enhanced gauge factor upto 1000. The thick film resistor of the present invention is obtained by inducing the strain sensitivity in thick film resistor after its fabrication on substrate by coating it with a formulation capable of gauge factor enhancement and subjecting it to high temperature in furnace. The usage of thick film resistor have industrial applications such as hybrid circuit and thermistors etc.

10 Claims, 6 Drawing Sheets

(a)

(b)

(c)

(d)

(e)

Figure 1:
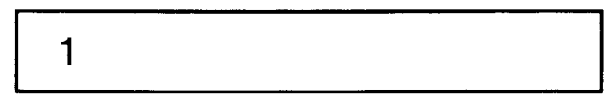
Figure 1:
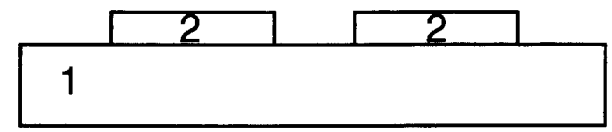
Figure 1:
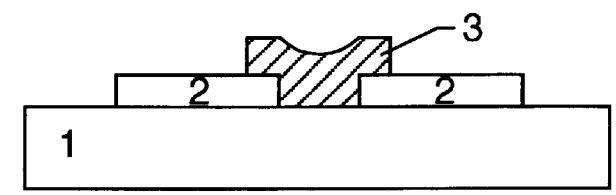
Figure 1:
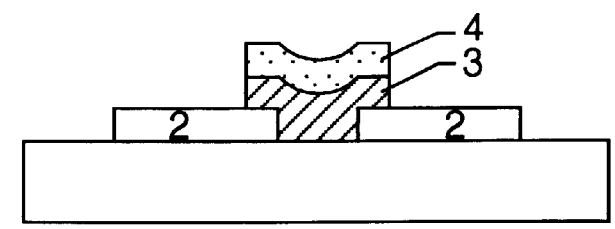
Figure 1:
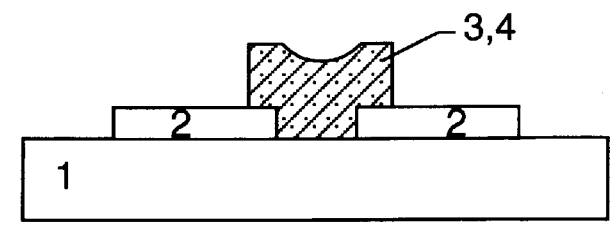

Fig. 5a  Ug3(3)  GF 70
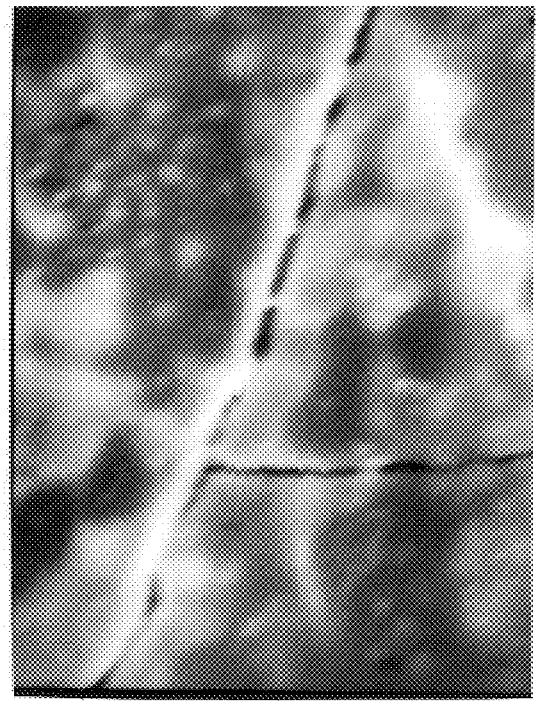
Fig. 5b  Ug3(9)  GF 600
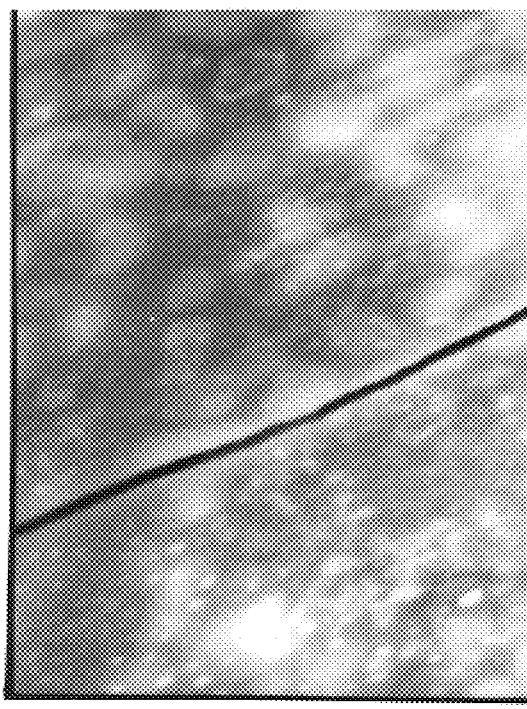
Fig. 5c  Ug4(10)
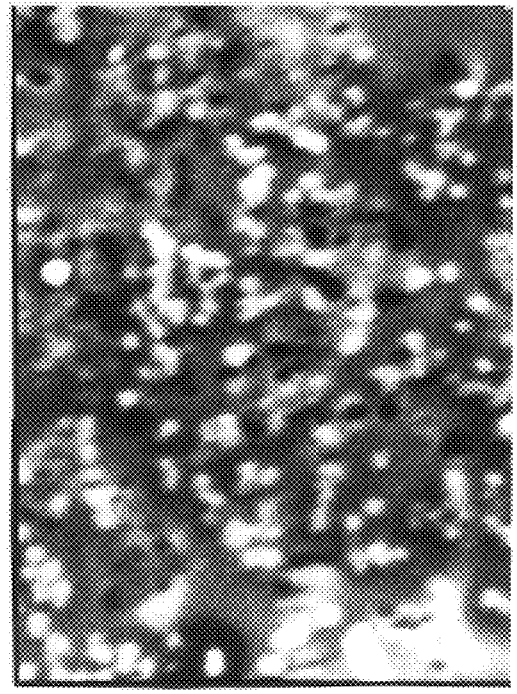
Fig. 5d  Ug 4(4)

Fig. 6a  A4(10)  GF 50
Fig. 6b  A4(9)  GF 350
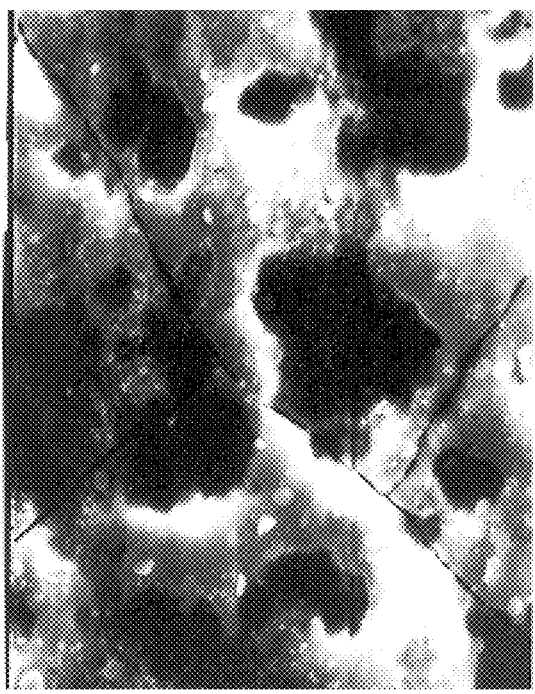
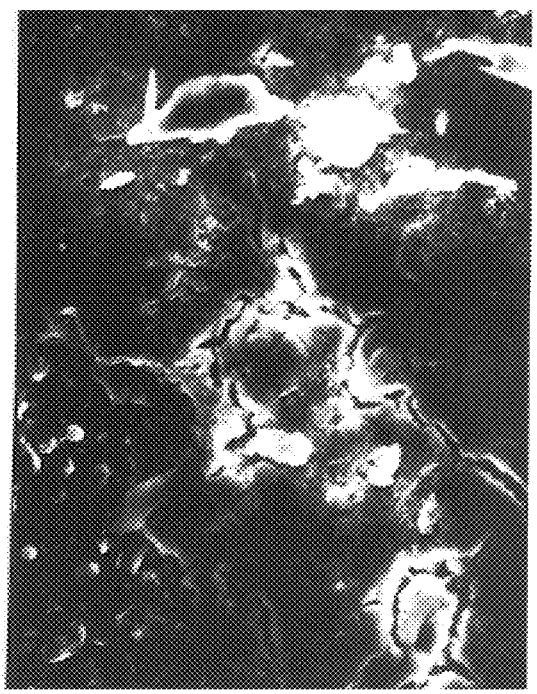
Fig. 6c  A1(9)  GF 700
Fig. 6d  A3(9)  GF 1000

PROCESS FOR THE PREPARATION OF A THICK FILM RESISTOR USEFUL FOR MAKING STRAIN GAUGE

FIELD OF INVENTION

This invention particularly relates to a thick film resistor and a process for the preparation of said thick film resistor useful for making strain gauge with enhanced gauge factor upto 1000.

The thick film resistor of the present invention is obtained by inducing the strain sensitivity in thick film resistor after its fabrication on substrate by coating it with a formulation capable of gauge factor enhancement and subjecting it to high temperature in furnace. The usage of thick film resistor have industrial applications such as hybrid circuit and thermistors etc.

BACKGROUND OF THE INVENTION

The hitherto known strain gauges are of two types. The first one, makes use of metal foil (Micro-Measurements, Measurements Group, Vishay Intertechnology, Inc., P.O.Box 306, 38905 Chase Road, Romulus, Mich. 48174) pressed between two insulating laminates and the second one, uses the silicon material (Kulite Semiconductor International Ltd., One Willow Tree Road, Leonia, N.J. 07605) having diffused layer formed by impurity drive-in at high temperature in an inert gas. The gauges thus formed exhibit 2–5 as the gauge factor for the former type and 45–175 for the latter version. Such gauges are fragile and are temperature sensitive too. The substrate is commonly used to mount the gauge onto it.

There is a definite need for the enhancement of gauge factor for improving the signal conditioners and for developing the sensors for medical applications.

Our studies have shown that such strain gauge of high gauge factor is not available and is not possible with existing material technology. Our studies have also provided us the experimental fact that it is possible to increase the gauge factor by enhancing the conductive phase size of thick film resistive material. As per our process the surface morphology of the thick film resistor material gets converted to long conductive phases and their tunnel distance get enhanced. This in turn decreases the effective sheet resistance and enhances the gauge factor through geometrical and piezoresistive effects. To the best of our knowledge till date such gauges based on thick film technology having enhanced gauge factor are not available internationally.

OBJECTS OF THE INVENTION

The main object of the present invention is to provide a thick film resistor and a process for the preparation of said thick film resistor useful for making strain gauge with enhanced gauge factor upto 1000 overcoming the drawbacks of the hitherto known strain gauges.

SUMMARY OF THE INVENTION

Our invention is based on the experimental fact that it is possible to increase the gauge factor by enhancing the conductive phase size of thick film resistive material. In our process, the surface morphology of thick film resistor material gets converted to long conductive phases and their tunnel distance get enhanced. This in turn decreases the effective sheet resistance and enhances the gauge factor through geometrical and piezoresistive effects.

This also follows from the well known equation for the gauge factor:

Gauge factor=GF $$1\partial R/R\partial s = 1\partial r/r\partial s + 2 - 1\partial v/v\partial s$$

where R is the resistance, s the strain, r the resistivity v is the volume. Naturally if $1\partial r/1\partial s$ is very high, the GF increases very much.

DESCRIPTION OF DRAWINGS AND PHOTO

Explaining an embodiment of the process steps of the present invention, FIG. 1 of the drawings represents the sectional view of the substrate (1) having conductor thick film (2) resistor thick film (3) and cyanometallic compound formulation (4) formed by silk screen printing and firing process respectively.

Figure 2:
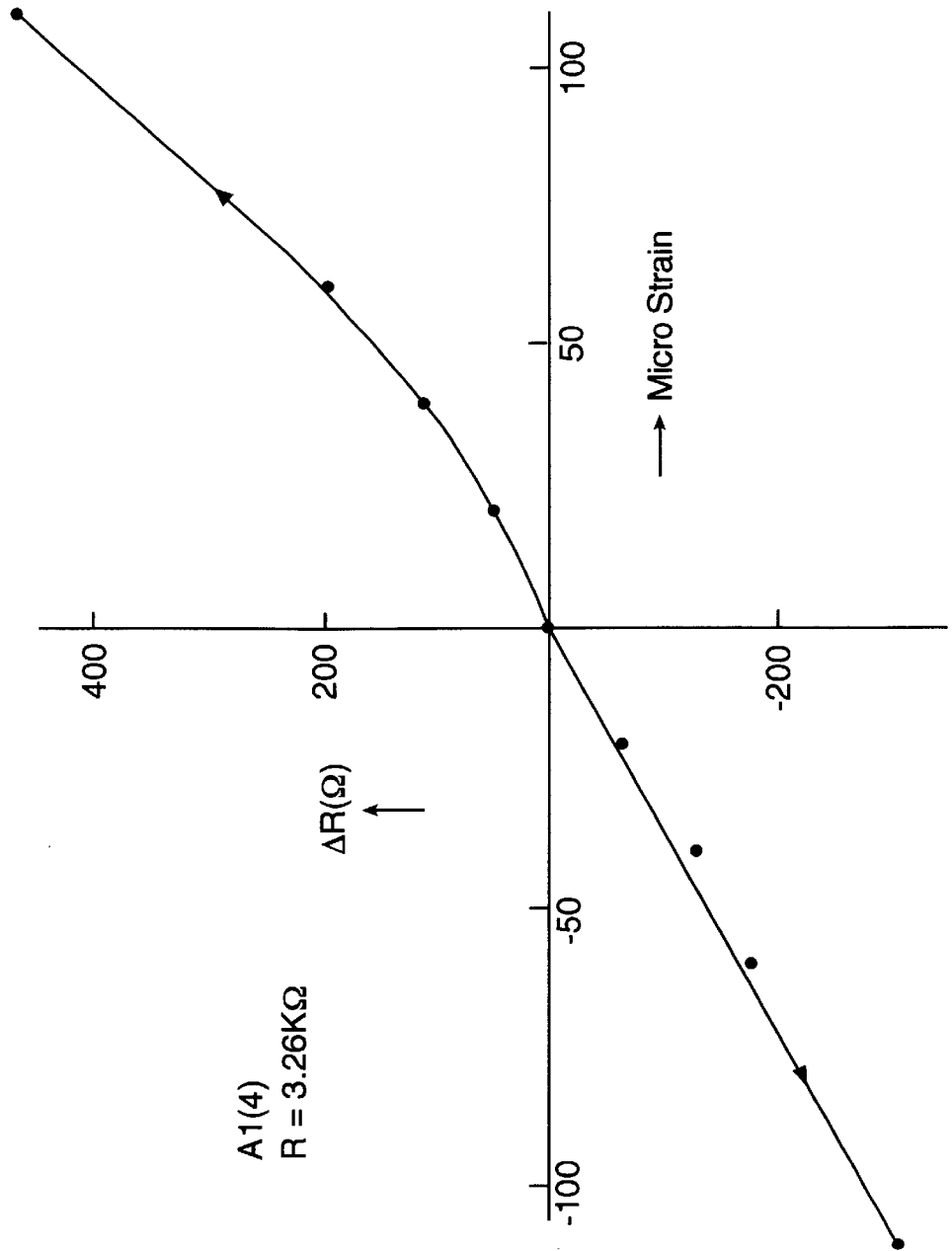

FIG. 2. shows the change in resistance as a function of strain for the sample A1 (4) prepared by the above process. It follows that the gauge factor is about 900 in the linear range.

Figure 3:
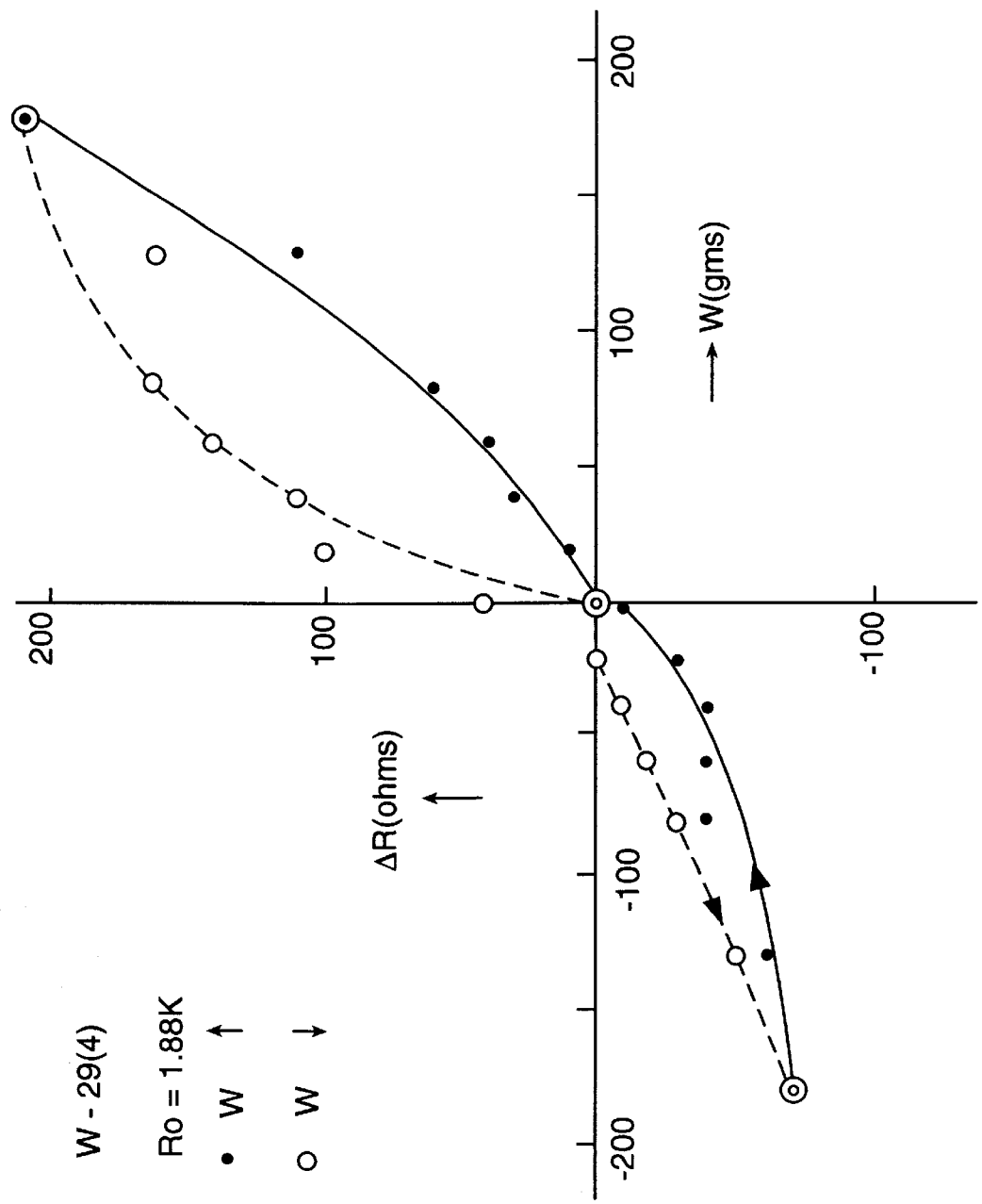

FIG. 3. shows the change in resistance with tensile and compressive strains for the sample W29(4) prepared by the above process. For the cantilever configuration used, 50 and 100 gms. of force produces 50 and 100 ppm of strain respectively. The gauge factor for the linear range, i.e., upto 50 ppm is 400.

Figure 4:
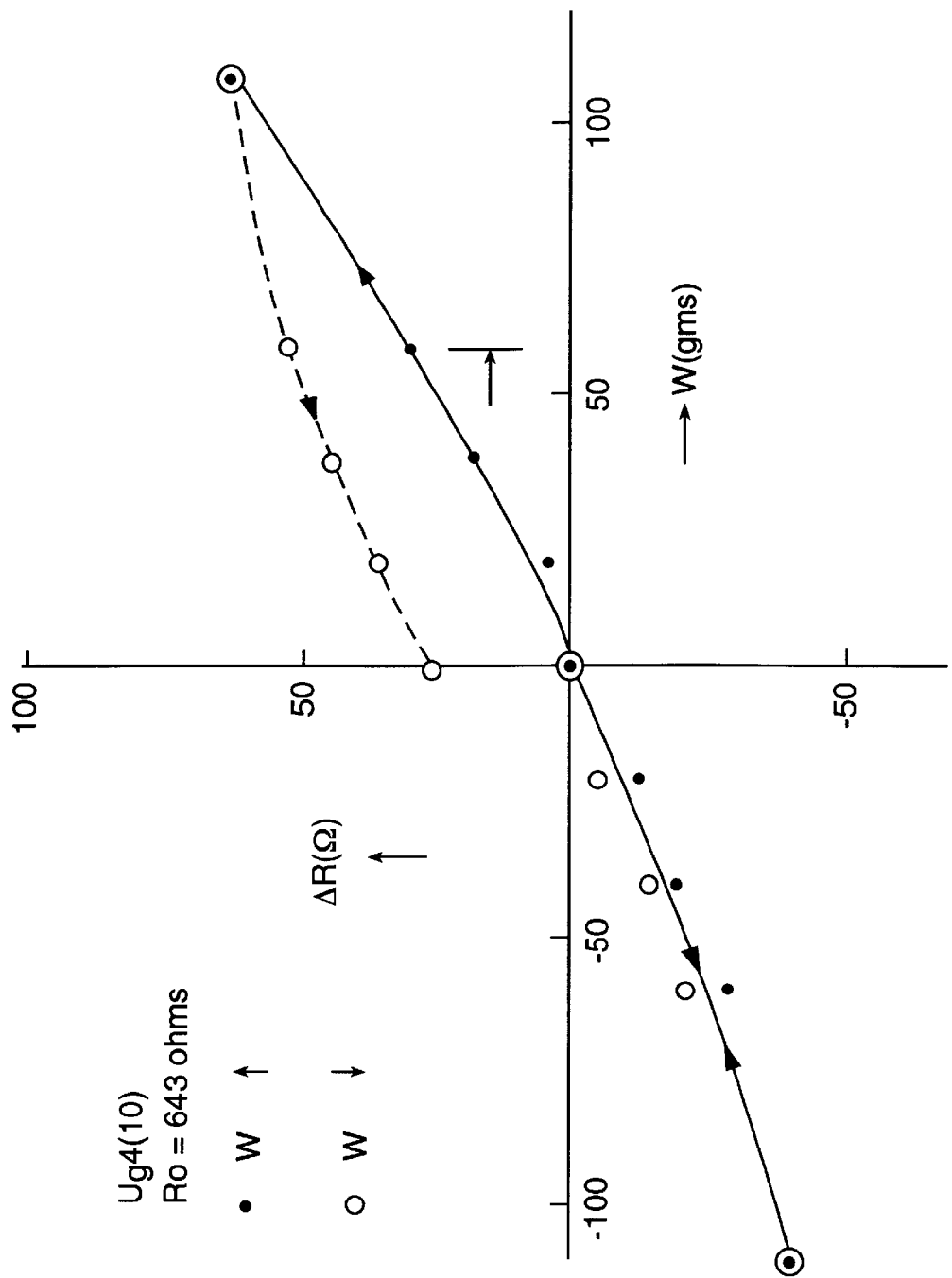

FIG. 4 shows the change in resistance with tensile and compressive strains for the sample Ug 4 (10) prepared by the above process. The gauge factor in the linear range for this sample is about 800.

DESCRIPTION OF PHOTOGRAPHS

The SEM photomicrographs lebelled as Ug3(3), Ug3(9), Ug4(10) and Ug4(4), which are designated as FIGS. 5a through 5d, illustrate that the top surface of the improved resistor consists of large islands covered with flakes.

The SEM photomicrographs rebelled as A4(10), A4(9), A1(9) and A3(9), which are designated as FIGS. 6a through 6d, illustrate that the top surface of the improved resistor consists of large islands covered with flakes.

DETAILED DESCRIPTION

Accordingly, the present invention provides a thick film resistor and a process for the preparation of said thick film resistor useful for making strain gauge with enhanced gauge factor upto 1000 which comprises : (a) cleaning an insulating substrate (1) capable of withstanding high temperature by known methods; (b) coating the said cleaned substrate by known method with a known non-corrosive conductor thick film (2) of thickness at least 10 microns, drying the coated substrate (1,2) at temperature in the range of 60–120° C. for at least 15 mins; (c) coating by known methods the thus prepared substrate (1,2) with a known resistor thick film (3) of thickness atleast 15 microns, drying the coated substrate (1,2,3) at temperature in the range of 60–120° C. for atleast 15 mins, optionally firing the thus prepared substrate (1,2,3) at temperature in the range of 800–900° C. for a period of 10–20 mins to obtain a thick film resistor (1,2,3); (d) coating by known methods the thus prepared thick film resistor (1,2,3) with a cyanometallic compound (4) of thickness in the range of 10–25 microns, drying the coated substrate (1,2,3, 4) at a temperature in the range of 60–120° C. for atleast 10 mins; (e) firing the thus prepared substrate (1,2, 3,4) to a temperature in the range of 800–900° C. for a period of 10–20 mins to obtain an improved thick film resistor useful for making strain gauge with enhanced gauge factor upto 1000.

The substrate (1) used may be selected from alumina substrate and enamelled steel which are capable of withstanding high temperature.

The substrate (1) may be cleaned by known methods selected from chemical method, ultrasonic cleaning in acetone, boiling in trylene and followed by rinse in methanol.

The coating of the substrate (1) with thick films (2,3,4) may be effected using standard silk screen printing technique commonly used for thick films.

The noncorrosive conductor thick film used may be such as Pt/Au, Pd/Ag, Pt and Au.

The resistor thick film used may be such as Birox formulation etc.

The cyanometallic compound used may be such as potassium gold cyanide solution, potassium ferrocyanide etc.

The drying and firing of the coated substrate may be effected in an air atmosphere.

The coated substrate after every heating at high temperature may be cleaned to remove dirt and impurities from it prior to next coating and heating.

In the process of the present invention we have prepared and improved thick film resistor capable of being used as a strain gauge with enhanced gauge factor. This has been possible through modifying the fine conductive phase to long conductive phase with enhanced tunnel distance (see photographs 1,2,3)

The following examples are given by way of illustrations and should not be construed to limit the scope of the present invention.

EXAMPLE-1

The sample A1 (4) was prepared by (a) cleaning the coors alumina substrate (2"×2"×0.6 mm), ultrasonically in methanol (b) coating it with Pd/Ag thick film paste of thickness 20 micron by screen printing; drying the coated substrate at 60° C. for 15 mins (c) coating the thus prepared substrate with Birox resistor thick film paste of thickness 20 micron by screen printing; drying the coated substrate at 60° C. for 15 mins; firing the thus prepared substrate at 850° C. for 10 mins to obtain a thick film resistor (d) coating the thus prepared thick film resistor body with potassium gold cyanide solution (acidic) 20 micron thick; drying the coated resistor at 60° C. for 10 mins.; (e) firing the thus prepared substrate at 850° C. for 10 mins. to obtaine an improved thick film resistor useful for making strain gauge with enhanced gauge factor upto 1000.

FIG. 2. shows the change in resistance as a function of strain for the sample A1 (4) prepared by the above process. It follows that the gauge factor is about 900 in the linear range.

EXAMPLE-2

The sample W29(4) was prepared by the method exactly as outlined in an example-1 except the potassium gold cyanide solution (acidic) was replaced by potassium ferrocyanide based solution of density 0.02 gm.cm−3.

FIG. 3. shows the change in resistance with tensile and compressive strains for the sample W29(4) prepared by the above process. For the cantilever configuration used, 50 and 100 gms. of force produces 50 and 100 ppm of strain respectively. The gauge factor for the linear range, i.e., upto 50 ppm is 400.

EXAMPLE-3

The sample Ug(10) was prepared by (a) cleaning the coors alumina substrate (2'×2'×0.6 mm) ultrasonically in methanol (b) coating it with Pd/Ag thick film paste of thickness 20 micron by screen printing; drying the coated substrate at 60° C. for 15 mins (c) coating the thus prepared substrate with Birox resistor thick film paste of thickness 20 micron by screen printing; drying the coated substrate at 60° C. for 15 mins, (d) coating the thus prepared thick film resistor body with potassium gold plating cyanide solution (acidic) 20 micron thick drying the coated resistor at 60° C. for 10 mins.; (e) firing the thus prepared substrate at 850° C. for 10 mins. to obtain an improved thick film resistor useful for making strain gauge with enhanced gauge factor upto 1000.

FIG. 4 shows the change in resistance with tensile and compressive strains for the sample Ug (10) prepared by the above process. The gauge factor in the linear range for this sample is about 800.

The main advantages of the process of the present invention are

1. The process is very simple as this requires only the cyanometallic compound to be coated on resistor thick film of the substrate.
2. The process is very easy to monitor as it necessitates the resistance measurement after heating only.
3. The process is highly cost effective as the cyanometallic compound coating requires no extra screen for printing.
4. Since the cyanometallic compound induces mixing therefore it is free from the problem of film peeling and thus increases the yield and the reliability.
5. The substrate is the integral part of the strain gauge.
6. The strain gauge can also be welded/bolted to the object of which the strain behaviour needs to be monitored by metallising the back surface of the strain gauge.

What is claimed is:

1. A process for the preparation of a thick film resistor useful for making strain gauge comprising:

(a) cleaning an insulating substrate;

(b) coating said substrate with a non-corrosive conductor thick film having a thickness of at least 10 microns;

(c) drying the conductor coated substrate at a temperature of about 60–120 C. for at least 15 mins;

(d) coating the prepared substrate with a resistor thick film having a thickness of at least 15 microns;

(e) drying the resistor coated substrate at a temperature in the range of 60–120 C. for at least 15 mins to obtain a thick film resistor;

(f) coating the prepared thick film resistor with a cyanometallic compound having a thickness in the range of 10–25 microns;

(g) drying the compound coated substrate at a temperature in the range of about 60–120 C. for at least 10 mins; and (h) firing the prepared substrate to a temperature in the range of 800–900 C. for a period of 10–20 mins to obtain an improved thick film resistor useful for making strain gauge with enhanced gauge factor of from 0 to 1000.

2. The process as claimed in claim 1 wherein the substrate used is selected from the group consisting of alumina substrate and enameled steel.

3. The process as claimed in claim 1 wherein the substrate is cleaned by chemical method, ultrasonic cleaning in acetone, boiling in trylene and followed by rinsing in methanol.

4. The process as claimed in claim 1 wherein the coating of the substrate with thick films is effected by standard silk screen printing technique commonly used for thick films.

5. The process as claimed in claim 1 wherein the non-corrosive conductor thick film used is selected from the group consisting of PdAg, PtAu, Pt and Au.

6. The process as claimed in claim 1 wherein the resistor thick film used is a BIROX formulation.

7. The process as claimed in claim 1 wherein the cyanometallic compound used is selected from the group consisting of gold plating solution and potassium ferrocyanide solution.

8. The process as claimed in claim 1 wherein the drying and firing steps are effected in an air atmosphere.

9. The process as claimed in claim 1 wherein the substrate is cleaned to remove dirt and impurities.

10. The process as claimed in claim 1, wherein the method comprises the step of drying the resistor coated substrate at a temperature in the range of about 60–120 C. for at least 15 mins, or firing the resistor coated substrate at a temperature in the range of 800–900 C. for a period of 10–20 mins.

* * * * *